United States Patent [19]

Wells et al.

[11] Patent Number: 4,673,501

[45] Date of Patent: Jun. 16, 1987

[54] BOTTLE TOP FILTER

[75] Inventors: John R. Wells, Culver City, Calif.; Carmelo G. Quirante, Bolingbrook, Ill.

[73] Assignee: Miles Laboratories, Inc., Elkhart, Ind.

[21] Appl. No.: 799,393

[22] Filed: Nov. 19, 1985

[51] Int. Cl.$^4$ .............................................. B01D 35/00
[52] U.S. Cl. .................................... 210/406; 210/469; 210/474; 422/101
[58] Field of Search ............... 210/406, 464, 469, 473, 210/474, 477, 478–482; 422/101–104

[56] References Cited

U.S. PATENT DOCUMENTS 2,465,623 3/1949 Zika .
2,874,843 2/1959 Townsend ........................... 210/406
3,010,583 11/1961 Kenyon .
3,437,211 4/1969 Lindsey .
3,782,175 1/1974 Roman .
4,251,366 2/1981 Simon et al. ........................ 210/406
4,301,010 11/1981 Eddleman et al. .
4,357,240 11/1982 Mehra et al. .

OTHER PUBLICATIONS

"Bottle Top Filter", Falcon Plastics (TM), Cat. No. 7104; Date ukn.

Primary Examiner—Frank Sever
Attorney, Agent, or Firm—Davidson, Louis E.; Donald G. Lewis

[57] ABSTRACT

A disposable vacuum assisted filter funnel for filtering fluids into bottles. The bottle top filter forms a vacuum dependent seal with the mouth of the bottle. When fluid is introduced into the bottle top filter, the evacuated bottle draws the fluid through the filter into the bottle. The bottle top filter lacks a vacuum plenum between the vacuum source and the bottle. The bottle top filter may be manufactured from one molded piece.

8 Claims, 8 Drawing Figures

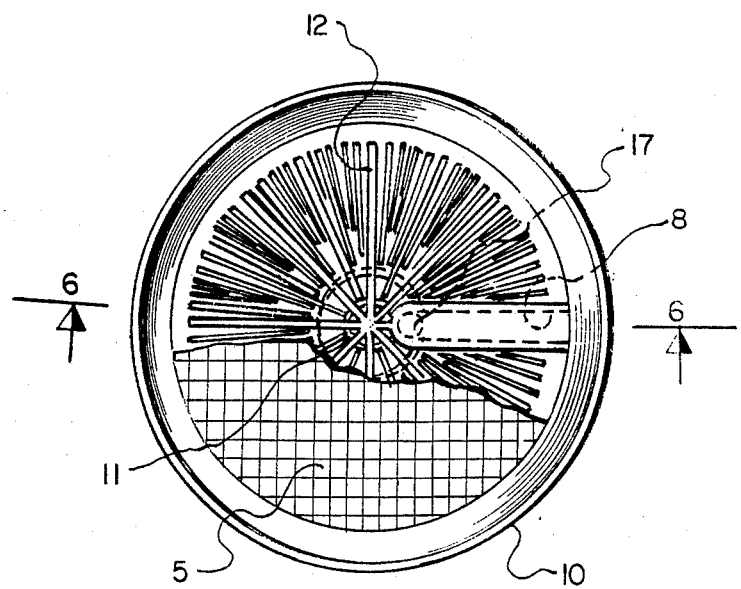
Fig. 5.
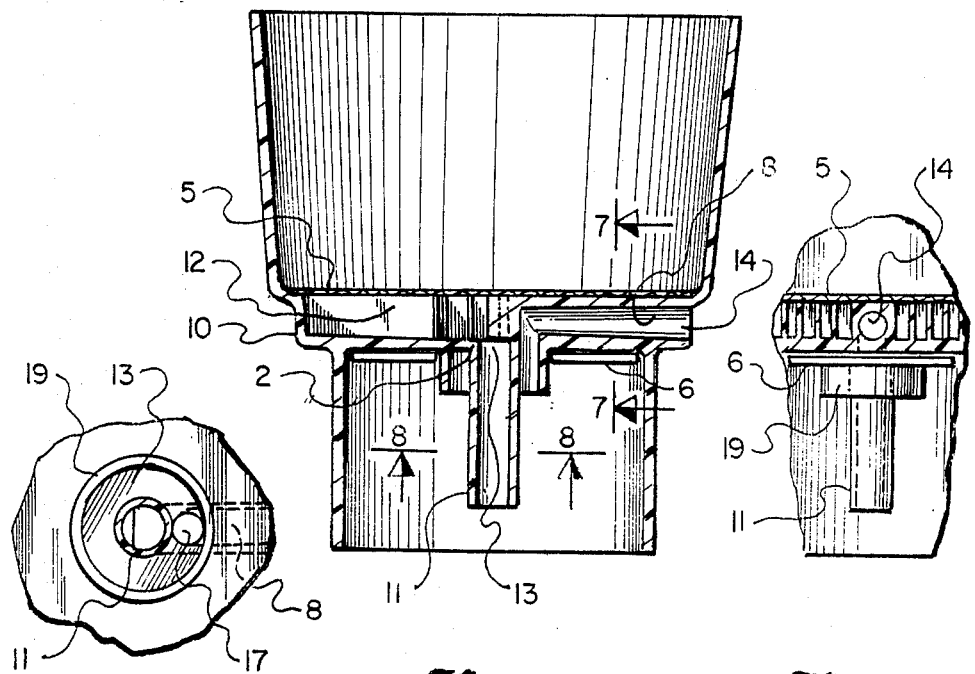
Fig. 6. Fig. 7.
Fig. 8.

BOTTLE TOP FILTER

FIELD OF THE INVENTION

The invention relates to a disposable filter funnel for bottles. More particularly, the invention is a disposable filter funnel which employs a vacuum for assisting the filtration of fluids into bottles.

BACKGROUND OF THE INVENTION

Many laboratory procedures require that a sterile fluid be filtered and stored within a bottle. It has been found to be advantageous to employ a sterile disposable vacuum assisted filter funnel for such procedures. Typically, the filter funnel attaches to the opening of the bottle and air is withdrawn from the bottle so as to increase the rate of filtration by increasing the pressure drop across the filter. The bottle top filter is one type of vacuum assisted filter funnel.

A prior art filter funnel having shared features with the present invention is described in U.S. Pat. No. 4,301,010 (Eddleman et al.). Eddleman describes a vacuum assisted filter funnel for drawing filtrate into a bottle. The Eddleman device includes a vacuum plenum (vacuum intake member) connectable to a vacuum source. During a filtration procedure, the Eddleman device is first sealed to the mouth of a bottle. The vacuum source is then engaged and fluid is introduced into the funnel. The bottle will be partially evacuated as air is drawn from the bottle into the vacuum plenum. This partial vacuum will tend to draw filtrate from the filter funnel into the bottle, thereby increasing the filtration flow rate. The vacuum plenum of the Eddleman device acts as a buffer against rapid pressure changes between the bottle and the vacuum source. If air is suddenly introduced into an evacuated bottle, a relatively large transient of air flow may be drawn into the vacuum plenum.

Another prior art filter funnel having shared similarity with both the present invention and the above Eddleman device is marketed by Becton Dickinson Inc., N.J., viz. the 'Bottle Top Filter,' Cat. No. 7104-Falcon (TM). Like the Eddleman device, but unlike the present invention, the Becton Dickinson device includes a vacuum plenum. However, like the present invention, the Becton Dickinson device employs a planar horizontal gasket which seals the device onto the lip of a bottle. This planar horizontal gasket attaches to the bottom of the vacuum plenum and encircles both a funnel tube and an ingress port. The ingress port faces the interior of the bottle for drawing air from the bottle into the vacuum plenum. Also like the present invention, the Becton Dickinson device includes an outer skirt which encircles the outer perimeter of the above gasket. This outer skirt serves as a guide for centering the engagement of wide necked bottles with the gasket. Without the outer skirt, the device could be placed off center onto a wide mouth bottle so as to fail to fully engage the gasket. The outer skirt of the Becton Dickinson device serves to prevent such off centered placement. Unlike the present invention, the Becton Dickinson device lacks an inner skirt for centering the placement of the device onto small mouthed bottles.

Another prior art filter funnel having shared features with the present invention is described in U.S. Pat. No. 4,251,366 (Simon et al.). The Simon device is distinguished from the present invention because the Simon device includes an adapter to seal and to mechanically retain the device onto the top of a bottle. This adapter is engaged to the bottle by means of screw threads; in turn, the filter funnel of the Simon device is then engaged onto this adapter by means of a gasket. The Simon device is further distinguished from the present invention because its funnel tube terminates within a vacuum plenum and discharges the filtrate therein. In contrast, the tube of the funnel of the present invention passes directly into a bottle. Also, the device of the present invention lacks a vacuum plenum.

The present invention teaches that it is sometimes undesirable to buffer against sudden pressure changes between the bottle and the vacuum source. The present invention teaches that the presence of a vacuum plenum between the vacuum source and the bottle may be unnecessary and undesirable. The present invention is structurally and functionally distinguished from the prior art by the absence of the vacuum plenum.

SUMMARY OF INVENTION

It is an object of the present invention to provide a device which does not require a vacuum plenum between the vacuum source and the bottle. It is another object of the present invention to enhance the integrity of the seal and to enhance the stability of the attachment between mouth of the bottle and the bottle top filter. It is yet another object of the present invention to provide an easily manufactured bottle top filter consisting of only one molded piece.

The present invention discloses that the presence or absence of a vacuum plenum in a bottle top filter can impart important structural and functional differences relating to the filtration process. The removal of a vacuum plenum from a bottle top filter will diminish the transient air blast which passes through an evacuated bottle upon the sudden introduction of air. A violent air blast can sometimes agitate the filtrate within the bottle, causing aerosol formation and loss of the filtrate. Also, the removal of a vacuum plenum from a bottle top filter will allow the bottle top filter to respond more quickly to a vacuum shut off. If, during a filtration procedure, a bottle theatens to overflow with filtrate, it is useful to be able to shut off the vacuum assisted filtration process.

The present invention also discloses how to enhance the integrity of the seal between mouth of the bottle and the bottle top filter. The bottle top filter includes a circular gasket which contacts the mouth of the bottle when the bottle top filter is positioned atop the bottle. Concentric skirts border the inside and outside diameters of the gasket. These skirts serve to guide the bottle top filter onto the top of the bottle so as to assure that the gasket contacts the mouth of the bottle. Before the bottle is evacuated, the bottle top filter sits atop the bottle with relatively precarious stability. After the bottle is evacuated, the atmospheric pressure will bear down upon the bottle top filter, enhancing the integrity of the seal and enhancing the stability of the bottle top filter. The bottle top filter should not be loaded with fluid until it is stabilized by the evacuated bottle. Elimination of the vacuum plenum lowers the center of gravity of the bottle top filter toward its position of support atop the mouth of the bottle. The lowering of the center of gravity is even more pronounced when the bottle top filter is loaded with fluid. The lower center of gravity enhances the stability of the device and the integrity of the seal.

The present invention also discloses how to manufacture the rigid plastic components of the bottle top filter as one molded piece. The elimination of the vacuum plenum allows the funnel, the filter support, and the vacuum conduit to be manufactured by injection molding as a single molded piece without seams. All that remains is to attach the rubber gasket to the bottom of the funnel and to insert and attach a filter atop the filter support inside the funnel. Manufacturing the rigid components as a single seamless piece eliminates subsequent assembly and gluing steps required in the prior art. More importantly, manufacturing the rigid components as a single seamless piece also eliminates a testing step for detecting air leaks at the seams between the assembled subcomponents.

BRIEF DESCRIPTION OF THE DRAWINGS

FIG. 1 also includes a bottle sealed to the bottle top filter and a vacuum source connected to the bottle top filter for drawing a vacuum from the bottle. FIG. 1 illustrates the process of the vacuum source urging the fluid to pass through the bottle top filter and into the bottle.

FIG. 5 is an enlarged plane view of the bottle top filter of FIG. 1 projected upward onto a horizontal plane. FIG. 5 illustrates the interior of the receptacle and the filter fitted therein. A removed fragment of the filter illustrates a preferred structure for the underlying filter support. Phantom lines illustrate the direct vacuum conduit and the tube which underlie the filter.

FIG. 6 is a sectional view of the enlarged bottle top filter of FIG. 5.

FIG. 7 is a fragmentary sectional view of the enlarged bottle top filter of FIG. 6 illustrating the egress port of the vacuum conduit.

FIG. 8 is a fragmentary sectional view of the enlarged bottle top filter of FIG. 6 illustrating the ingress port of the vacuum conduit and the open end of the funnel tube.

DETAILED DESCRIPTION OF THE INVENTION

Figure 1:
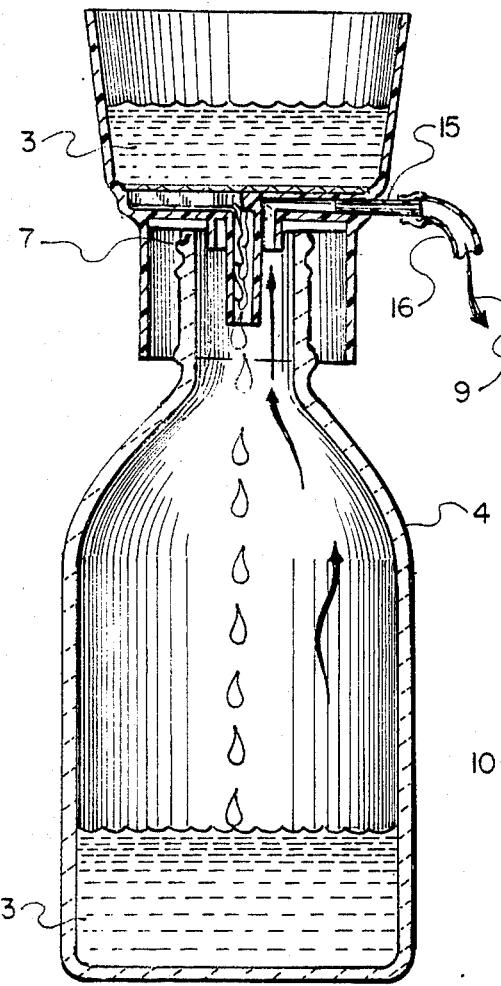
FIG. 1 is a sectional view of a preferred embodiment of the bottle top filter.
Figure 3:
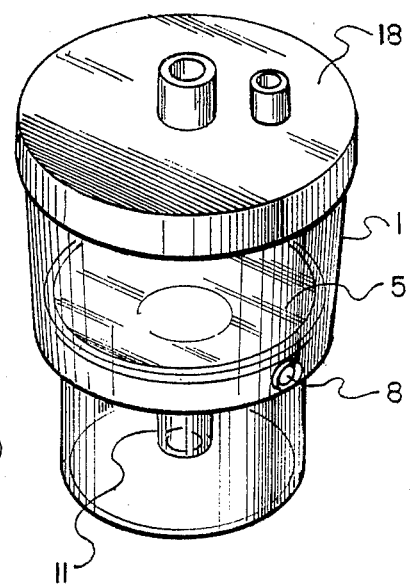
FIG. 3 is a perspective view of the bottle top filter of FIG. 1 illustrating a lid which may be employed for maintaining the sterility of the receptacle.
Figure 2:
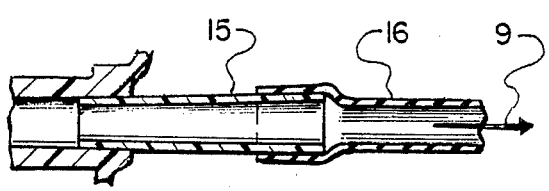
FIG. 2 is an enlarged sectional view of the vacuum adaptor of FIG. 1.
Figure 4:
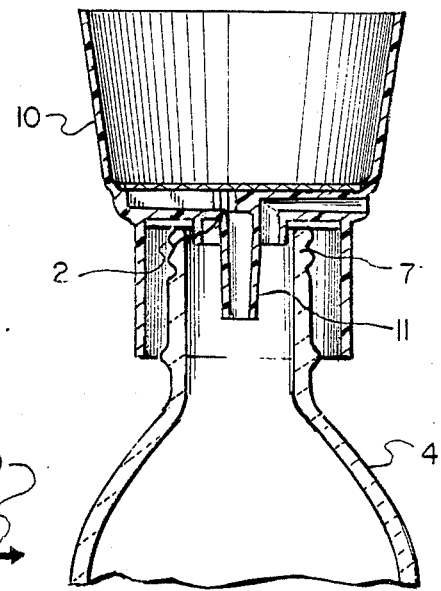
FIG. 4 is a sectional view of the bottle top filter and the bottle of FIG. 1, shown without the fluid or the vacuum adaptor.

A preferred embodiment of the bottle top filter (1) is illustrated in FIG. 1. This preferred embodiment includes a funnel (2) for receiving fluids (3) and channeling the fluids (3) to a bottle (4). Fitted within the funnel (2) is a filter (5) for filtering fluids (3) which pass through the funnel (2). A gasket (6) is adherently attached to the funnel (2) for establishing a seal between the funnel (2) and the mouth (7) of the bottle (4). A direct vacuum conduit (8) bridges the gasket (6) and is connected to a vacuum source (9) for pulling a vacuum from the bottle (4) and urging fluid (3) through the filter (5).

The funnel (2) includes a receptacle (10) and a tube (11). The receptacle (10) catches fluids (3) and directs the fluids (3) into the tube (11). The tube (11) is insertable into the bottle (4) and is connected to the receptacle (10) for channeling fluids (3) from the receptacle (10) to the bottle (4).

The filter (5) is fitted into the receptacle (10) so as to filter fluid (3) passing from the receptacle (10) to the tube (11). If a fluid (3) passes through the funnel (2), the fluid (3) must cross the filter (5). Beneath the filter (5) is a filter support (12). This filter support (12) is nested within the receptacle (10) and provides support for the filter (5).

The gasket (6) is adherently attached to the receptacle (10). Within the perimeter of the gasket (6) is a gasket hole (13). When the funnel (2) and the bottle (4) are sealed to one another, the mouth (7) of the bottle (4) contacts the gasket (6) and encircles the gasket hole (13). In this sealed position, the tube (11) extends through the gasket hole (13) and into the bottle (4). When the bottle (4) is evacuated, the force of atmospheric pressure will bear down on the receptacle (10) and will enhance the sealing contact between the gasket (6) and the mouth (7) of the bottle (4).

In the preferred embodiment shown in FIG. 1, the direct vacuum conduit (8) is incorporated into the receptacle (10) and provides a passage way for the flow of air from the bottle (4) to the vacuum source (9). The direct vacuum conduit (8) includes an egress port (14) which is positioned outside the perimeter of the gasket (6) and is connectable to the vacuum source (9). In the preferred embodiment illustrated in FIG. 1, the egress port (14) is configured as a tapered hole into which is inserted a vacuum adapter (15) having a complementary taper. The egress port (14) is substantially perpendicular to the axis of the tube (11) and is accessible from the exterior of the receptacle (10). The egress port (14) is positioned radially outward from the perimeter of the gasket (6). A vacuum hose (16) is attached to the vacuum adapter (15) and leads to the vacuum source (9). The direct vacuum conduit (8) also includes an ingress port (17) which is positioned inside the gasket hole (13) in the gasket (6). When the bottle top filter (1) is fitted onto the bottle (4) and the gasket (6) contacts the mouth (7) of the bottle (4), the ingress port (17) opens into the bottle (4). When the vacuum source (9) is connected to the egress port (14), air flows into the ingress port (17), through the vacuum conduit (8), and out the egress port (14).

In an alternative embodiment of the invention, a plug of filter material may be inserted into the vacuum conduit (8). If air should back flow through the vacuum conduit (8), the inserted plug of filter material will tend to preserve the sterility of the vacuum conduit (8), the bottle (4), and, more importantly, the filtrate contained therein. Air can sometimes back flow into the vacuum conduit (8) when the vacuum source (9) is broken at the conclusion of a filtration procedure or during the course of a filtration procedure.

To initiate a bottle top filtration procedure, a bottle top filter (1) is fitted onto the bottle (4) and air is drawn from the bottle (4) by connecting and opening the vacuum source (9) to the egress port (14). The seal between the gasket (6) and the mouth (7) of the bottle (4) prevents the flow of air across the gasket (6). However, if there is no fluid in the funnel (2), air will be drawn into the bottle (4) through the funnel (2) when a partial vacuum is drawn from the bottle (4). Introducing fluid (3) into the receptacle (10) and submerging the filter (5) will block the passage of air through the funnel (2). Once the funnel (2) is blocked with fluid, the bottle (4) can then be easily evacuated by withdrawing air through the vacuum conduit. Partial evacuation of the bottle (4) allows the atmospheric pressure to urge the fluid (3) to pass through the filter (5) and into the bottle (4). It is the primary function of the bottle top filter (1) to accelerate the rate of filtration.

In the preferred embodiment shown in FIG. 1, the direct vacuum conduit (8) lacks a vacuum plenum. An example of a prior art bottle top filter which includes a plenum within its vacuum conduit is provided by Eddleman et al. (supra). The present invention teaches that the absence of a plenum within the direct vacuum conduit (8) is advantageous for the operation and manufacture of the bottle top filter (1). The absence of a vacuum plenum improves the performance of the bottle top filter (1) and simplifies its manufacture.

As compared to prior art funnel filter devices which include a vacuum plenum, the bottle top filter (1) of the present invention performs with an enhanced responsiveness for rapidly halting the filtration process. There are at least three ways to halt the filtration process:

1. Closing the vacuum source (9);
2. Breaking the seal between the gasket (6) and the mouth (7) of the bottle (4); and
3. Completing the filtration process by passing all of the fluid (3) in the receptacle (10) through the filter (5).

If an excess amount of fluid (3) has been added to the receptacle (10) and the bottle (4) threatens to overflow, the vacuum drawn filtration process must be halted so as to allow the user to substitute a second bottle (4) for receiving the excess fluid (3). The unassisted filtration rate, i.e. the gravitational filtration rate, is usually slow enough to allow the user to switch the bottle top filter (1) from one bottle to another without significant dripping and loss of filtrate. The vacuum drawn filtration process may be halted during the filtration process either by closing off the vacuum source (9) or breaking the seal between the gasket (6) and the bottle (3). If the vacuum source is closed off from a device having a vacuum plenum, the vacuum reservoir within the vacuum plenum will cause fluid (3) to continue to be drawn through the filter (5) after the vacuum source (9) is closed off. Elimination of the vacuum plenum shortens the reaction time for halting the vacuum assisted filtration process once the vacuum source (9) is closed. The preferred embodiment of the invention excludes a vacuum plenum from the vacuum conduit (8). A vacuum conduit which draws air directly from the bottle to the vacuum source, without an intervening vacuum plenum, is termed a direct vacuum conduit.

The vacuum assisted filtration process may also be halted mid-stream by breaking the seal between the gasket (6) and the mouth (7) of the bottle (4). Breaking this seal will cause air to rush past the gasket (6) and into the bottle (4) and the ingress (9). Without a vacuum plenum, breaking the seal between the gasket (6) and the mouth (7) of the bottle (4) will quickly expose the ingress (9) to atmospheric pressure and cause the vacuum source to reach its capacity flow rate. However, if a vacuum plenum is present, breaking the seal will cause a large transient flow rate to pass though the ingress (9) so as to fill the vacuum plenum. Transiently drawing large quantities of air into the vacuum conduit (8) can create aerosols within the bottle (4) and can cause these aerosols to be swept into the vacuum conduit (8). Eliminating the vacuum plenum reduces the vacuum reservoir of the vacuum conduit and reduces the transient increase of air flow through the bottle after the seal is broken.

After drawing all of the fluie through the filter and emptying the receptacle, the vacuum source may then draw air through the filter once again. Without a vacuum plenum, the flow rate through the filter will quickly reach a capacity level. However, the addition of a vacuum plenum will increase the transient flow rate of air into the bottle and the ingress. This transient air flow passes through the tube and is directed towards the filtrate. As with the transients caused by breaking the seal, transients passing through the tube can cause aerosols to be swept into the vacuum conduit (8). Eliminating the vacuum plenum reduces the vacuum reservoir of the vacuum conduit and reduces the transient increase of air flow through the bottle after the filtration process is complete.

In an alternative embodiment of the invention, the funnel (2), the filter support (12), and the direct vacuum conduit (8) are molded as a single seamless piece. Manufacturing the combination of the funnel (2), the filter support (12), and the direct vacuum conduit (8) as one molded piece eliminates the need for subsequent assembly steps, including gluing or joining. More importantly, molding this combination as one piece eliminates the need for testing for leakage between the joints of the subcomponent parts. After manufacturing this one piece combination, the only remaining assembly steps for making a complete bottle top filter (1) are the attachment of the gasket (6) to the bottom of the receptacle (10) and fitting the filter (5) over the filter support (12). An example of this alternative embodiment is illustrated in FIG. 1. This particular embodiment employs a vacuum conduit (8) having an egress port (14) which is positioned radially outward from the perimeter of the gasket (6), substantially perpendicular to the axis of the tube (11) and which is accessible from the exterior of the receptacle (10).

Another alternative embodiment of the invention includes a lid (18). The lid (18) is useful for maintaining the sterility of the receptacle (10).

Another alternative embodiment of the invention includes an inner skirt (19). The inner skirt (19) abuts the inside perimeter of the gasket hole (13). The inner skirt (19) serves to guide the bottle top filter (1) onto the bottle (4). The presence of the inner skirt (19) assures that the mouth (7) of the bottle (4) will encircle the gasket hole (13) when the bottle top filter (1) is fitted onto the bottle (4). This alternative embodiment may also include an outer skirt (20). The outer skirt (20) is attached to the base of the funnel (2) and abuts the outside perimeter of the gasket (6). When the bottle top filter (1) is placed atop a bottle (4), the outer skirt (20) lies to the outside of the mouth (7) of the bottle (4). The outer skirt (20) serves to guide the bottle top filter (1) onto the bottle (4). The inner skirt (19) and outer skirt (20) may be parallel and concentric to one another.

What is claimed is:

1. A bottle top filter employing a vacuum source for filtering a fluid and passing the fluid into a bottle, the bottle top filter comprising:

a funnel including a receptacle and a tube, the receptacle of said funnel for catching the fluid and directing the fluid into the tube, the tube connected to the receptacle and insertable into the bottle for channeling the fluid from the receptacle into the bottle, a filter support nested within the receptacle, a filter fitted into the receptacle over said filter support and supported by said filter support for filtering the fluid channeled from the receptacle into the tube, a gasket attached to the receptacle for sealing the receptacle to the bottle, said gasket defining a perimeter and a hole, the tube extending through the hole for inserting into the bottle, and a means for providing a direct vacuum conduit for conducting air directly from the bottle to the vacuum source, said direct vacuum conduit lacking a vacuum plenum and incorporated directly into the receptacle, said direct vacuum conduit including an egress port and an ingress port, the egress port positioned outside the perimeter of said gasket for connecting said direct vacuum conduit to the vacuum source, the ingress port positioned inside the hole of said gasket for drawing off air from the bottle, said funnel and said direct vacuum conduit forming a single seamless molded piece, so arranged to provide means for connecting the vacuum source to said direct vacuum conduit and sealing said funnel to the bottle by means of said gasket for causing air to be drawn from the bottle directly into the vacuum source through the direct vacuum conduit, and, further, after introducing the fluid into said funnel, for causing the fluid to be drawn across said filter through the tube and into the bottle.

2. A bottle top filter as recited in claim 1 wherein: said funnel, said direct vacuum conduit, and said filter support forming a single seamless molded piece.

3. A bottle top filter as recited in claim 1 further comprising:
an adaptor for inserting into the egress port of said vacuum conduit and connecting with the vacuum source.

4. A bottle top filter as recited in claim 1 further comprising:
a plug of filter material inserted into said direct vacuum conduit for preserving the sterility of the vacuum conduit and the bottle.

5. A bottle top filter employing a vacuum source for filtering a fluid and passing the fluid into a bottle, the bottle top filter comprising:
a funnel including a receptacle and a tube, the receptacle of said funnel for catching the fluid and directing the fluid into the tube, the tube connected to the receptacle and insertable into the bottle for channeling the fluid from the receptacle into the bottle, a filter support nested within the receptacle, a filter fitted into the receptacle over said filter support and supported by said filter support for filtering the fluid channeled from the receptacle into the tube, a gasket attached to the receptacle for sealing the receptacle to the bottle, said gasket defining a perimeter and a hole, the tube extending through the hole for inserting into the bottle, a means for providing a direct vacuum conduit for conducting air directly from the bottle to the vacuum source, said direct vacuum conduit lacking a vacuum plenum and incorporated directly into the receptacle, said direct vacuum conduit including an egress port and an ingress port, the egress port positioned outside the perimeter of said gasket for connecting said direct vacuum conduit to the vacuum source, the ingress port positioned inside the hole of said gasket for drawing off air from the bottle, and an inner skirt attached to the receptacle within the hole in said gasket and adjacent to said gasket for guiding the bottle top filter onto the bottle, said funnel and said direct vacuum conduit forming a single seamless molded piece, so arranged to provide means for connecting the vacuum source to said direct vacuum conduit and sealing said funnel to the bottle by means of said gasket for causing air to be drawn from the bottle directly into the vacuum source through the direct vacuum conduit, and, further, after introducing the fluid into said funnel, for causing the fluid to be drawn across said filter through the tube and into the bottle.

6. A bottle top filter as recited in claim 5 further comprising:
an outer skirt attached to the receptacle outside the perimeter of said gasket and adjacent to said gasket for guiding the bottle to filter onto the bottle.

7. A bottle top filter as recited in claim 6 wherein:
said direct vacuum conduit being incorporated into the receptacle and
said funnel, said direct vacuum conduit, and said filter support, said inner skirt, and said outer skirt, forming a single seamless molded piece.

8. In an improved bottle top filter employing a vacuum source for filtering a fluid and passing the fluid into a bottle, the improved bottle top filter including:
a funnel including a receptacle and a tube, the receptacle of said funnel for catching the fluid and directing the fluid into the tube, the tube connected to the receptacle and insertable into the bottle for channeling the fluid from the receptacle into the bottle, a filter support nested within the receptacle, a filter fitted into the receptacle over said filter support and supported by said filter support for filtering the fluid channeled from the receptacle into the tube, and a gasket attached to the receptacle for sealing the receptacle to the bottle, said gasket defining a perimeter and a hole, the tube extending through the hole for inserting into the bottle, wherein the improvement comprising:

means designed for precluding the need for a vacuum plenum between the vacuum source and the bottle, including a means for providing a direct vacuum conduit for conducting air directly from the bottle to the vacuum source, the direct vacuum conduit lacking a vacuum plenum and incorporated directly into the receptacle, the direct vacuum conduit including an egress port and an ingress port, the egress port positioned outside the perimeter of said gasket for connecting the direct vacuum conduit to the vacuum source, the ingress port positioned inside the hole of said gasket for drawing off air from the bottle, said funnel, said filter support, and the direct vacuum conduit forming a single seamless molded piece, so arranged for providing means for connecting the vacuum source to the direct vacuum conduit and sealing said funnel to the bottle by means of said gasket for causing air to be drawn from the bottle directly into the vacuum source through the direct vacuum conduit, and, further, after introducing the fluid into said funnel, for causing the fluid to be drawn across said filter through the tube and into the bottle without the benefit of a vacuum plenum between the vacuum source and the bottle.

* * * * *